US006254822B1

(12) United States Patent
Brundage

(10) Patent No.: US 6,254,822 B1
(45) Date of Patent: *Jul. 3, 2001

(54) PRODUCTION OF POROUS MULLITE BODIES

(75) Inventor: Kevin R. Brundage, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,248

(22) Filed: Sep. 30, 1999

Related U.S. Application Data
(60) Provisional application No. 60/102,620, filed on Oct. 1, 1998.

(51) Int. Cl.$^7$ ........................................................ B28B 3/20
(52) U.S. Cl. .............................................. 264/638; 264/681
(58) Field of Search ................................ 264/630, 638, 264/669, 681

(56) References Cited

U.S. PATENT DOCUMENTS

| | | |
|---|---|---|
| 4,295,892 * | 10/1981 | Matsuhisa et al. .................. 501/120 |
| 4,601,997 | 7/1986 | Speronello ........................... 502/263 |
| 4,608,357 | 8/1986 | Silverman et al. ..................... 502/84 |
| 4,628,042 | 12/1986 | Speronello ........................... 502/263 |
| 4,826,790 | 5/1989 | Jones et al. ............................. 501/80 |
| 4,921,616 | 5/1990 | Minjolle ............................... 210/767 |
| 4,935,390 | 6/1990 | Horiuchi et al. ..................... 501/128 |
| 4,950,628 | 8/1990 | Landon et al. ....................... 501/119 |

FOREIGN PATENT DOCUMENTS

| | | |
|---|---|---|
| 42 26 276 | 2/1994 | (DE) . |
| 0 236 249 | 1/1987 | (EP) . |

* cited by examiner

Primary Examiner—Christopher A. Fiorilla
(74) Attorney, Agent, or Firm—Timothy M. Schaeberle

(57) ABSTRACT

Porous sintered ceramic materials having mullite as its primary phase and a method for producing them. The method includes preparing a plasticizable raw material mixture comprised, by weight, of 75–99% of the mullite powder and 1.0 to 25% of the water swelling clay and 5–25% of the alumina and/or alumina-yielding precursor, adding an organic binder system to the mixture and mixing the mixture to form an extrudable mixture, and extruding the mixture to form a substrate of the desired configuration. The green body is dried and fired for a time and at temperature sufficient to form a sintered mullite structure having an acid/base exposure strength loss of less than about 20%.

5 Claims, 2 Drawing Sheets

10μm

10μm

PRODUCTION OF POROUS MULLITE BODIES

This application claims the benefit of U.S. Provisional Application No. 60/102,620 filed Oct. 1, 1998, entitled "Production of Porous Mullite Bodies", by Brundage.

BACKGROUND OF THE INVENTION

1. Field of the Invention

The present invention relates to chemically durable porous mullite-based ceramic articles and a process for the manufacturing the same. The mullite-based ceramic articles are particularly suitable for use as a porous filtration devices and/or supports in the chemical processing industry.

2. Discussion of the Related Art

In the field of membrane separations, thin porous membranes deposited on porous supports are widely used for microfiltration and ultrafiltration of liquid media and gas separation. The macroporous support functions to provide mechanical strength for the thin porous membrane. Porous support materials include alumina, cordierite, mullite, silica, spinel, zirconia, other refractory oxides and various oxide mixtures, carbon, sintered metals and silicon carbide.

Several considerations and limitations are important in selecting the appropriate material for the porous support. The porous support should preferably exhibit the following characteristics: (1) a total porosity, as measured by Hg intrusion of greater than 30%; (2) a high permeability; and, (3) pores exhibiting good connectivity, a greater than submicron average pore size and a narrow size distribution. The combined effect of these properties is that the porous support will exhibit both good filtration efficiency and permeability such that the porous support will be suitable for most microfiltration and ultrafiltration applications. Lastly, for chemical processing applications, the porous support should exhibit a sufficiently high mechanical strength (MOR) and very high resistance to chemical attack. It is this last characteristic, resistance to chemical attack, that makes mullite particularly preferred for use in these chemical processing applications.

It is known to those skilled in the art, that one conventional method for making a sintered mullite structure involves firing, at about 1600° C., a mixed powder of alumina ($Al_2O_3$) and silica ($SiO_2$), the constituent components of mullite; i.e. the reaction sintered formation of mullite bodies. Although mullite structures produced in this manner exhibit sufficient chemical resistance and mechanical strength, the mullite structures formed in this conventional manner are dense and exhibit pores of a submicron average pore size.

Mullite formation methods involving the use of pre-reacted mullite powder represent an improvement over the aforementioned reaction sintered methods. Two such reference which disclose the use of pre-reacted mullite powder include U.S. Pat. No. 4,935,390 (Horiuchi et al.) and German Pat. No. 42 26 276 (Levkov).

The Horiuchi reference discloses a method for forming a sintered mullite-based body, having improved flexural strength, involving heat treating a composition of 80 to 99.1%, and 0.1 to 20%, by weight, of a mullite powder and a sintering aid, yttrium oxide, respectively. The Levkov reference discloses a method for the production of a ceramic sintered filter body characterized in that the starting mixture consists of 90–93% mullite, having grains of between 0.63 to 0.1 mm, an opening material, either 4–8% cork scrap or 12–16% rubber scrap, having a grain size of up to a maximum of 0.2 mm, and a binder comprising 5–7% clay and 1–3% $Al_2O_3$; all in weight percent. Although both of these processes result in the production of mullite bodies exhibiting larger pore sizes and improved filtration when compared to reaction sintered mullite bodies, the filtration efficiency of these mullite bodies and their chemical durability are not such that they would be suitable for use in those applications where the porous supports would be exposed to highly basic or highly acidic environments akin to those environments seen in the chemical processing industry.

A recent innovation disclosed in copending, co-assigned application, U.S. Ser. No. 60/102,621 (Brundage et al.) results in mullite bodies which are improved over those disclosed in the Horiuchi and Levkov references. The sintered mullite bodies, possessing improved filtration efficiency and permeability, are produced from a raw material composition comprised of 75 to 99% by weight pre-reacted mullite powder, and 1.0 to 25% by weight of a water-swelling clay. Although these mullite bodies exhibit improved filtration properties, the chemical durability, sufficient for most applications involving the microfiltration and ultrafiltration of liquid media and gas separation, is below that necessary for use in those chemical processing applications involving exposure to highly basic or highly acidic environments.

There is, accordingly, a clear need for a means for producing a porous mullite structure exhibiting an increased chemical durability and possessing both sufficient filtration efficiency and permeability suitable for use as porous supports in the chemical processing industry.

SUMMARY OF THE INVENTION

The object of the present invention is to solve the above problems of the prior art and to provide a method for making a sintered ceramic substrate, having mullite as its primary phase, having improved resistance to chemical attack and sufficient filtration efficiency and permeability.

It has been surprisingly found that when a water swelling clay, in combination with the use of pre-reacted mullite powder and alumina, comprise the raw materials used in the preparation of mullite structures, the resulting ceramic bodies exhibit the above mentioned properties. Specifically, the invention is directed at a composition for use in preparing a sintered substrate, having mullite as its primary phase, comprised of 75 to 99%, by weight, pre-reacted mullite powder, and 1.0 to 25%, by weight, of a water-swelling clay and 6–25%, by weight, of an alumina and/or an alumina-yielding precursor.

This invention also relates to a method for producing a sintered ceramic substrate having mullite as its primary phase, comprising preparing a plasticizable raw material mixture as defined above, adding an organic binder system to the mixture and mixing the mixture to form an extrudable mixture, and extruding the mixture to form a substrate of the desired configuration.

The green body is dried and fired for a time and at temperature sufficient to form a sintered mullite structure exhibiting an acid/base exposure strength loss of less than about 20%.

DETAILED DESCRIPTION OF THE INVENTION

Figure 1:
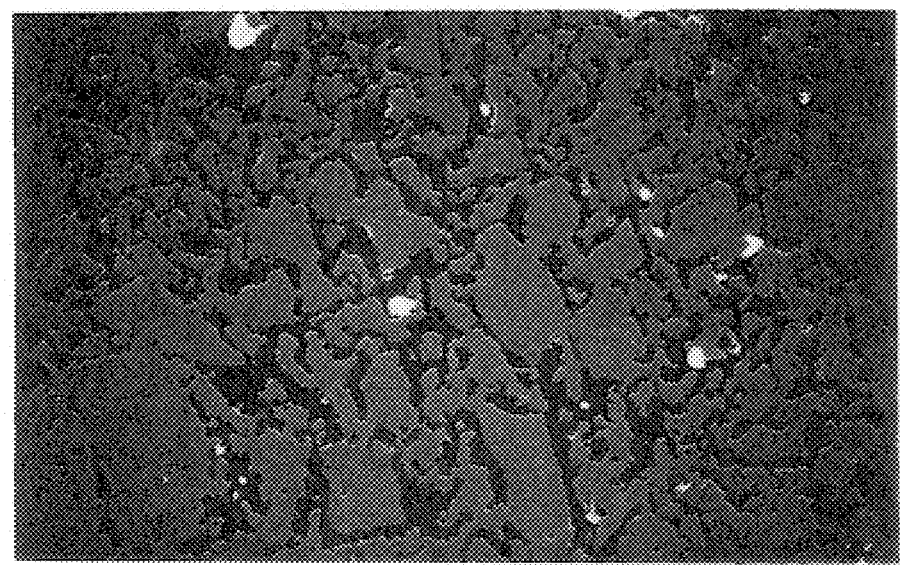
FIGS. 1 and 3 are SEM photographs taken at 500 × and 2500×, respectively, illustrating the crystal structure of the inventive mullite sintered body of Example 1.

A plasticizable mixture for use in preparing a ceramic substrate having mullite as its primary phase is prepared according to this invention and comprises, as raw materials, pre-reacted mullite powder, an amount of a water-swelling clay and an amount of alumina and/or an alumina-yielding precursor. The relative amounts of these materials which will comprise the admixture will depend on the desired fired composition, but will generally be utilized so that, by weight on an analytical oxide basis, the admixture comprises about 30 to 60% $SiO_2$, 30 to 70%, $Al_2O_3$, and 1 to 10% MgO.

An acceptable source of mullite powder for use a starting raw material may be powder obtained by mixing alumina and silicon oxide, calcining the mixture to form mullite and pulverizing the mullite. An example of an acceptable mullite powder is that manufactured by C-E Minerals (King of Prussia, Pa.) and marketed as Mulcoa®. Generally, the finer the average particle size of the mullite powder the stronger and more chemically durable the so-formed mullite substrate will be while still exhibiting the coarse average pore size and high overall porosity. Preferably, the mullite powder exhibits an average particle size of less than about 150 μm, and more preferably less than about 50 μm.

An acceptable water swelling clay for use in the present invention includes a bentonite-type montmorillonite clay. One specific water swelling clay suitable for use in the invention is Bentolite, manufactured and marketed by Southern Clay Products (Gonzales, Tex.)

Regarding the alumina and/or alumina-yielding precursor, alumina-yielding precursors such as boehmite or hydrated alumina are acceptable for use in the invention, however fine alumina, preferably a-alumina, is preferred because of its greater reactivity. One specific alumina acceptable for use in this invention includes A-16SG sold by Alcoa Industrial Chemicals, Pittsburgh, Pa.

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylcellulose, methylcellulose derivatives, and combinations thereof, a surfactant component, preferably stearic acid, and a solvent comprising water. Excellent results have been obtained utilizing a binder system which comprises the following amounts, assuming 100 parts by weight of the inorganic clay, mullite and alumina, raw material mixture: about 0.2 to 2 parts by weight of the sodium stearate, about 2.5 to 5 parts by weight of a methylcellulose or hydroxypropyl methylcellulose binder, and about 8 to 30 parts by weight of the water.

The individual components of the binder system are mixed with a mass of the inorganic powder material, e.g., the mullite powder, the water-swelling clay and alumina mixture, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a honeycomb substrate suitable for use as a porous support for use in chemical processing applications, extrusion through a die, is preferable.

The prepared ceramic green body is then dried for a period of about 5–20 minutes prior to firing, by any conventional method such as hot-air drying or dielectric drying, with dielectric being the preferred method. The dried green body is thereafter fired at a sufficient temperature and for a sufficient time so as to result in a fired ceramic body containing mullite as its primary phase. The firing conditions can vary depending on the process conditions such as specific composition and nature of the equipment. However, some preferred firing conditions are as follows:

heating the green body to a first temperature of about 600° C. to about 650° C. at a firing rate of about 5° C. to about 25° C. per hour, preferably about 18° C. per hour and thereafter from the first temperature to a second temperature of between about 1400° C. to about 1550° C. at a firing rate of about 10° C. to about 50° C. per hour, and preferably about 25° C. per hour, and holding at the third temperature for about 6 hours to about 16 hours, preferably about 10 hours, and thereafter cooling the green body to room temperature at a cooling rate of about 100° C. to about 200° C. per hour.

As previously mentioned, it has been found that by utilizing a combination of the water-swelling clay, the pre-reacted mullite powder and the alumina and/or alumina-yielding precursor as the main raw material components of the batch mixture, the mixture described herein is most suitable for preparing porous mullite substrates exhibiting increased chemical durability and sufficient permeability and filtration efficiency. Although the invention is particularly advantageous for preparing porous substrates suitable for use as porous supports for use in chemical processing applications involving exposure to highly basic and/or acidic environments, the claimed mixtures can also be used for forming mullite structures for use in other applications. Those other applications include, for example, porous supports for microfiltration and ultrafiltration of liquid media and gas separation, as well as, applications such as diesel particulate filters, molten metal filters and catalyst supports.

The sintered mullite bodies formed according to the present invention are characterized by properties inherent to mullite, including, for example a total Hg porosity of about 30%. Furthermore, the inventive mullite bodies possess an increased chemical durability as indicated by an acid/base exposure strength loss of less than about 20%. The acid/base exposure strength loss is a measure that compares the initial cellular crush strength of honeycomb substrates with that of the same honeycomb substrate after exposure to a 2-day acid/base durability screening test. In other words, the initial cellular crush strength is compared to the exposed or resultant cellular crush strength to generate a percentage strength loss. Specifically, the 2-day acid/base test involves subjecting the honeycomb substrate to two exposure cycles as follows: (1) 24 hour exposure in 0.1M HCl at a temperature 95° C. and a pH of 1; and, (2) 24 hour exposure in 1.2M NaOH at a temperature of 95° C. and a pH of 14.

The mullite bodies made according to the present invention are additionally characterized by the inherent property of coarse sized pores exhibiting an average pore size, as measured by Hg intrusion, of between about 2 to 15 $\mu$m, as well a good filtration efficiency and a correspondingly good permeability. Regarding the filtration efficiency, it is measured according to the National Sanitation Foundation NSF 53-196 protocol utilizing fine Arizona road dust.

While not intending to limited by theory, the inclusion of the alumina in the raw material composition contributes to the resultant formation of mullite bodies comprising much less free, intergranular silica (i.e., less free silica available for chemical attack), smaller, yet still coarse, pore sizes and finer mullite crystal agglomerates when compared to those mullite bodies formed without the inclusion of alumina and/or alumina-yielding precursors in the starting raw material. It is theorized that these changes are a result of the alumina reacting with available free silica within and around the mullite agglomerates resulting in the slightly smaller mullite agglomerates and the decrease in the average pore size exhibited by the mullite bodies. More specifically, the inventive mullite bodies exhibit bridges or connections between the mullite agglomerates that have greatly reduced amounts of free silica than the prior art mullite bodies, which, in turn improves the chemical durability as evidenced by a corresponding increase in the resistance to acid/base strength exposure loss. Furthermore, it is thought that failure in these inventive and prior art mullite bodies most likely initiates at the bridge between particles where the stress concentration is the greatest. As such, a reduction in the available free silica for attack in these areas directly results in a resistance to chemical attack thereby allowing for a much slower rate of strength degradation in acid/base environments. Although finer porosity generally indicates higher surface area for chemical attack and correspondingly a decrease in the chemical durability, it is theorized that the reduction in free silica has a much greater effect in increasing the chemical resistance than the finer porosity has on decreasing the resistance to chemical attack.

EXAMPLES

To further illustrate the principles of the invention of the present invention, there will be described an example of the mullite body formed according to the invention, as well as comparative mullite and cordierite bodies. However, it is to be understood that the examples are given for illustrative purpose only, and the invention is not limited thereto, but various modifications and changes may be made in the invention, without departing from the spirit of the invention.

Examples 1–5

Inorganic powder batch mixtures suitable for the formation of a ceramic body having mullite as its primary crystalline phase are listed in TABLE I; as listed in percent by weight. Each of the mullite compositions 1–4, compositions 2–4 being comparative mullite compositions, were prepared by combining and dry mixing together the components of the designated inorganic mixture as listed in TABLE I. An amount of the organic binder system listed in TABLE I was then added to each of the inorganic dry mixtures and thereafter further mixed to form a plasticized ceramic batch mixture. Each of these 4 different plasticized ceramic batch mixtures comprised differing amounts of the binder system components, as detailed in TABLE I; ranging from 25.75 to 28.25 parts by weight, based on 100 parts total inorganics.

Each of the various plasticized mixtures were extruded through an extruder under conditions suitable to form to form 100 cell/in. ceramic honeycomb substrate logs exhibiting a diameter of 1 tol 1¼ in., a cell wall size of 24 mils and a length of between about 1 to 2 in. The ceramic honeycomb green logs formed from each of the 4 batch compositions were dried for approximately 10 minutes, cut into 3 in. substrates and thereafter subjected to a heating and firing cycle sufficient to remove the organic binder system from, and to sinter, the honeycomb substrates. Specifically, the green substrates were fired under conditions in accordance with the aforementioned firing schedule. Generally, the bodies were fired to between 1400 and 1550° C. and held for a period of about 10 hours; i.e., firing conditions suitable for forming ceramic bodies having mullite as their primary phase.

Regarding composition 5, a comparative cordierite composition, it was prepared in generally the same manner as the 4 mullite compositions, including the firing of the cordierite composition.

The filtration efficiency, permeability, mechanical strength and mean intrusion pore size of the inventive mullite and the comparative mullite and cordierite honeycomb substrates were measured. The intrusion porosity data was generated utilizing a conventional mercury intrusion porosimetry technique using a mercury porosimeter manufactured by the Micromeritics Corp, specifically the Autopore II 9220 V3.04. The filtration efficiency data was generated utilizing the aforementioned National Sanitation Foundation test. Permeability data is 16 mil data using conventional methods of testing permeability and is reported in ml per minute per inch squared per inch water column. The mechanical strength, modulus of rupture (MOR) or flexure strength, was measured on 5/16 in. rods, produced in the same manner as the honeycomb substrates, and is reported in psi units.

The chemical durability of the inventive and comparative composition honeycomb substrates was measured in the manner as described above. In short, the initial cellular crush strength of each of the honeycomb substrates was measured and then the substrate was subjected to a 2-day acid/base durability screening test after which the resultant or exposed cellular crush strength was measured. The initial cellular crush strength was thereafter compared to the exposed cellular crush strength to generate an acid/base exposure strength loss. These numbers are recorded in Table I as Cellular Crush Strength, Initial and Exposed, and Strength Loss.

TABLE I

|  | 1 | 2 | 3 | 4 | 5 |
|---|---|---|---|---|---|
| INORGANICS | | | | | |
| Mullite powder | 76.79[2] | 90.0[2] | 100.0[1] | 90.0[2] | — |
| Water Swelling Clay | 8.53[3] | 10.0[3] | — | — | — |
| Talc | — | — | — | — | 39.95 |
| Kaolin clay | — | — | — | 10.0 | 16.61 |
| Silica | — | — | — | — | 12.56 |
| Alumina | 14.79[4] | — | — | — | 30.89 |
| BINDER | | | | | |
| Methocel | 3.75 | 3.75 | 3.75 | 3.75 | 3.0 |
| Stearic Acid | 1.0 | 1.0 | 1.0 | 1.0 | 1.0 |
| Water | 23.0 | 23.5 | 22.5 | 21.0 | 25.0 |
| PROPERTIES | | | | | |
| Filtration Efficiency (%) | — | 99.995 | — | — | — |
| Permeability | — | 1.0 | — | — | — |
| Mean Intrusion Pore Size (μm) | 2.44 | 3.83 | 3.74 | 2.48 | 10.96 |
| MOR (psi) | 10511 | 6670 | 2654 | 5536 | 2108 |
| Cellular Crush (psi) | | | | | |
| Initial | 11105 | 11189 | 3843 | 11015 | 4817 |
| Exposed | 10296 | 7097 | 2491 | 7751 | 990 |
| Strength Loss (%) | 7.3 | 36.6 | 35.2 | 29.6 | 79.4 |

[1] C-E Minerals (King of Prussia, PA) Mulcoa 70-200
[2] C-E Minerals Mulcoa 70-325
[3] Southern Clay Products (Gonzales, TX) Bentolite L
[4] Alcan C-701 Alumina (Cleveland, OH)

Figure 2:
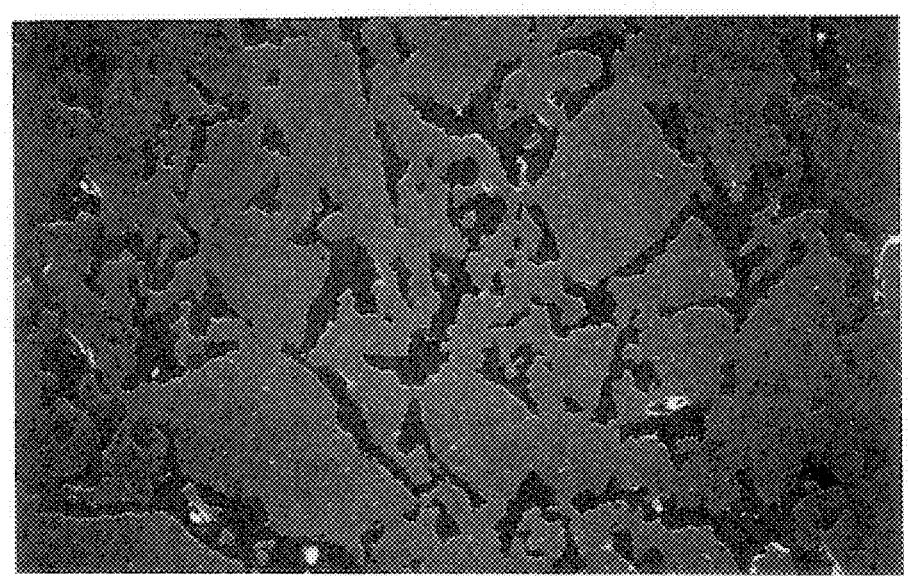
FIGS. 2 and 4 are SEM photographs of the taken at 500× and 2500×, respectively, illustrating the crystal structure of the comparison mullite sintered body of Example 2.
Figure 3:
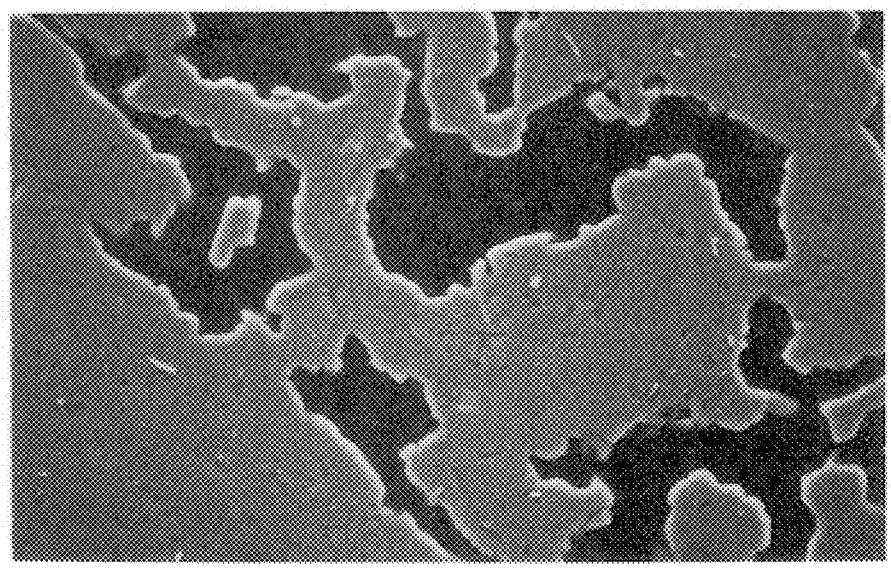
Figure 4:
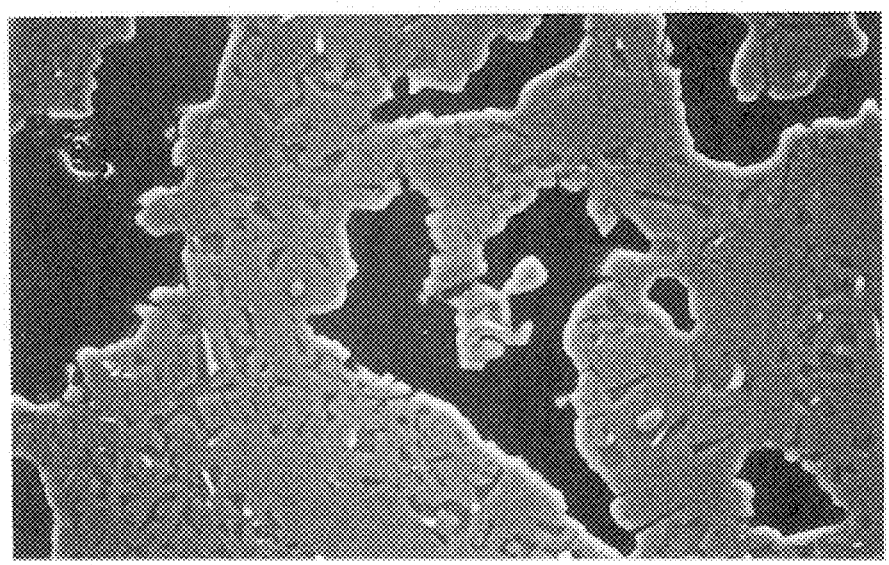

A comparison of FIGS. 1 and 2, SEMs of Example 1 and 2, respectively, taken at 500×, reveals that the substrate/composition detailed in FIG. 1, formed according to the invention detailed herein, exhibits both slightly smaller, though still coarse, pores (the dark areas) and finer mullite crystal agglomerates (gray areas) when compared to the comparison composition of FIG. 2. Comparing FIGS. 3 and 4, SEMs of Examples 1 and 2, respectively, taken at 2500×, reveals that the inventive composition detailed in FIG. 3 contains less intergranular silica (the slightly darker areas that are within the gray mullite agglomerates) when compared to the substrate/composition of FIG. 4. In spite of the reduction in mullite agglomeration size and average pore size which is shown by the comparison of FIGS. 1 and 2, which would be expected to decrease the chemical resistance of the mullite bodies, the inventive mullite bodies have an increased chemical resistance as reported in Table I. Specifically, the acid/base exposure strength loss exhibited by Example 1, 7.6%, is substantially less then that exhibited by the comparison Example 2, 36.6%; i.e., Example 1 exhibited a substantially greater resistance to chemical attack. It should also be noted that the acid/base exposure strength loss of Example 1 is far less than the other examples detailed in TABLE 1 as well; 7.6% vs. values ranging from 29.6% to as high as 79.4% (Example 5 being a standard cordierite body). As described above, it is thought that the reduction in the amount of intergranular silica, as revealed by the comparison of FIGS. 3 and 4, is the phenomenon responsible for increased resistance to chemical attack, as evidenced by the decreased acid/base exposure strength loss.

As these examples show, incorporation of the submicron alumina, in amounts of up to about 25% in combination with the use of pre-reacted mullite and water swelling clay into the batch mixture results in sintered mullite-based ceramic substrates having an increased chemical durability. The increased chemical durability of these mullite bodies without the loss of the those inherent excellent properties thereof; e.g., permeability and filtration efficiency renders these inventive mullite substrates capable for use as filters and or porous supports in highly basic or acidic environments as is found in the chemical processing industry.

What is claimed is:

1. A method for producing a sintered ceramic substrate having mullite as its primary phase, comprising the following steps:

preparing a plasticizable inorganic raw material mixture having a chemical composition comprising, in percent by weight, of 30 to 60% $SiO_2$, 30 to 70%, $Al_2O_3$, and 1 to 10% MgO, the raw material mixture comprising an amount of pre-reacted mullite powder, an amount of a water-swelling clay and an amount of alumina and/or alumina-yielding precursor;

adding an organic binder system to the inorganic mixture;

kneading the inorganic mixture;

extruding inorganic mixture to form a green substrate; and thereafter, firing the substrate for a time and at temperature sufficient to form a sintered mullite having an acid/base exposure strength loss of less than about 20%.

2. The method for producing a sintered ceramic substrate having mullite as its primary phase, as claimed in claim 1 wherein the composition consists, by weight, of 75–99% of the mullite powder and 1.0 to 25% of the water swelling clay and 5–25% of the alumina and/or alumina-yielding precursor.

3. The method for producing a sintered ceramic substrate having mullite as its primary phase, as claimed in claim 1, wherein the composition consists, by weight, of 75–85% of the mullite powder and 2.5 to 12.5% of the water swelling clay and 12–20% of the alumina and/or alumina-yielding precursor.

4. The method for producing a sintered ceramic substrate having mullite as its primary phase, as claimed in claim 1, wherein the composition consists, by weight, of 76.8% of the mullite powder, 8.5% of the water swelling clay and 14.8%, by weight, of the alumina and/or alumina-yielding precursor.

5. The method for producing a sintered ceramic substrate having mullite as its primary phase, as claimed in claim 1 wherein the water swelling clay is a montmorillonite bentonite clay.

\* \* \* \* \*